(12) United States Patent
Johnson

(10) Patent No.: US 11,457,646 B2
(45) Date of Patent: Oct. 4, 2022

(54) ANTI-OXIDATION FRYING DEVICE

(71) Applicant: Lance P. Johnson, Uniontown, OH (US)

(72) Inventor: Lance P. Johnson, Uniontown, OH (US)

(*) Notice: Subject to any disclaimer, the term of this patent is extended or adjusted under 35 U.S.C. 154(b) by 650 days.

(21) Appl. No.: 16/183,833

(22) Filed: Nov. 8, 2018

(65) Prior Publication Data
US 2019/0069571 A1 Mar. 7, 2019

Related U.S. Application Data

(62) Division of application No. 15/089,894, filed on Apr. 4, 2016, now Pat. No. 10,123,548, which is a division of application No. 13/841,298, filed on Mar. 15, 2013, now Pat. No. 9,386,881.

(51) Int. Cl.
| A23D 9/06 | (2006.01) |
| A47J 37/12 | (2006.01) |
| A23L 5/10 | (2016.01) |
| A23L 5/30 | (2016.01) |
| C11B 5/00 | (2006.01) |
| A23L 3/32 | (2006.01) |

(52) U.S. Cl.
CPC .................. *A23D 9/06* (2013.01); *A23L 3/32* (2013.01); *A23L 5/11* (2016.08); *A23L 5/30* (2016.08); *A47J 37/1266* (2013.01); *C11B 5/00* (2013.01); *A23V 2002/00* (2013.01)

(58) Field of Classification Search
CPC ....................................................... A23L 3/32
See application file for complete search history.

(56) References Cited

U.S. PATENT DOCUMENTS

| 4,593,170 A | 6/1986 | Maeda et al. |
| 5,335,080 A | 8/1994 | Park |
| 5,544,567 A | 8/1996 | Davis et al. |
| 6,828,527 B2 * | 12/2004 | Simic-Glavaski .... A47J 27/004 219/386 |
| 2009/0261793 A1 | 10/2009 | Urakabe et al. |
| 2010/0119668 A1 * | 5/2010 | Maupin .................. A23L 3/005 426/237 |

OTHER PUBLICATIONS

Advantage Oil Series. Integrated Rectifier Technologies Inc. Retrieved from Internet URL: https://irtrectifier.com/products/rectifiers/advantage-oil-series-rectifier/. (Year: NA).*

* cited by examiner

*Primary Examiner* — Stephanie A Cox
(74) *Attorney, Agent, or Firm* — Renner, Kenner, Greive, Bobak, Taylor & Weber

(57) ABSTRACT

An anti-oxidation frying device includes a frying vessel having an electrically conductive body configured to heat cooking oil carried therein by a heating unit. A removable basket, also formed of electrically conductive material, is configured to be carried within the frying vessel to enable the cooking of food in the heated oil. A rectification circuit is coupled to the heating unit, the body of the frying vessel, and the basket. During operation the rectification circuit converts AC power from an external power source into a rippled, rectified AC current signal that is supplied to the heating unit, body of the frying vessel, and the basket, so as to create a reducing environment of available electrons for absorption by the cooking oil and food as it is prepared, thus extending the life of the cooking oil.

6 Claims, 11 Drawing Sheets

ANTI-OXIDATION FRYING DEVICE

CROSS REFERENCE TO RELATED APPLICATIONS

This application is a divisional of U.S. patent application Ser. No. 15/089,894, filed Apr. 4, 2016, which is a divisional of U.S. patent application Ser. No. 13/841,298, filed Mar. 15, 2013, each of which is incorporated herein by reference.

TECHNICAL FIELD

Generally, the present invention relates to a frying device, such as a deep fryer, that uses cooking oil in which to cook food. In particular, the present invention is directed to a frying device that prevents the oxidation of the cooking oil and food being cooked therein. More particularly, the present invention is directed to an anti-oxidation frying device that provides an electron source that passes electrons through a non-electrolyte cooking oil, such as vegetable oil, so as to extend the useful operating life of the cooking oil.

BACKGROUND ART

The ingestion of externally generated oxidative food products prepared, or otherwise cooked by a thermal process, such as cooking, cooling, storing, serving, and the like, may be carcinogenic. Such effect is believed to be the result of the depletion of electrons in the food as a result of the thermal excitation and oxidation of the food during preparation. However, by creating a reducing environment where electrons are supplied to the food during its preparation, the oxidative damage, as well as its carcinogenic potential, can be reduced.

To achieve such a result, cookware products have been developed that provides a food carrying vessel that maintains a pair of connection points that supply an electrical potential and electrical current to the food as it is being prepared. In the case of current anti-oxidation frying devices they use a wire mesh basket that carries electrons from an electron source to the cooking medium, whereupon the electrons are carried to the food being cooked in a cooking medium, such as vegetable oil. However, the porous mesh-frying basket is unable maintain a sufficient amount of surface area in contact with the cooking medium to carry the necessary amount of electrons from an electron source to create the electron rich reducing environment for the food being cooked therein. As a result, the food and the cooking oil itself does not receive the appropriate amount of anti-oxidizing effects from the electron flow.

An additional drawback of current anti-oxidation frying devices, such as deep fryers, is that frying oil is subject to harsh operating conditions, which result in its frequent replacement, which is tedious and time consuming, in addition to begin highly costly over time. Specifically, frying oil is subject to atmospheric oxygen, high heat, and moisture for extended periods of time, resulting in deterioration, and the subsequent production of off-flavors and harmful compounds in the frying oil, which necessitates the generally frequent replacement of the cooking oil. In addition, the frying process results in the accelerated formation of thermal oxidation and polymerization products in the cooking oil, and frying above 195 degrees Celsius causes isomerization of polyunsaturated fatty acids in the cooking oil, which is undesirable.

Thus, there has been much interest in methods of extending the useful life of the cooking oil, including lowering the temperature of the cooking oil that is used during the frying process. While using a lower frying temperature can slow the degradation of the cooking oil, it generally results in food that has an unpleasant texture and an unsatisfactory flavor profile. In addition, hydrogenation of cooking oils have been contemplated to create higher levels of unsaturation, which result in a more stable cooking oil with a higher melting point, and thus a longer useful operating life. However, the hydrogenated cooking oil results in the formation of trans-fatty acids, which have come under scrutiny for their negative effects on human health.

Anti-oxidants have also been incorporated into cooking oils to protect the oil and the food items cooked therein from the degradation experienced during the frying process, and to extend the life of the cooking oil. For example, antioxidants, such as butylated hydroxyl anisole (BHA), butylated hydroxyl toluene (BHT) and tertiary butylated hydroxyl quinone (TBHQ) have been used to slow down lipid oxidation by quenching oxygen free radicals from the cooking oil. Moreover, citric acid, which is capable of chelating metals involved in lipid redox reactions, have been administered during processing to help protect oils from oxidation. However, fortifying the cooking oil with such chemicals poses a heath concern due to the lack of historical data on their safety, and given their negative perception by the public, and their unproven abilities in extending cooking oil life, their use has not been widely adopted. Finally, another attempt at extending cooking oil life and improving its stability is to utilize a filtration and absorbent process to remove the decomposition/oxidation products from the cooking oil. Unfortunately, this method is expensive and must be performed daily to achieve optimal benefits, creating a waste product that must then be disposed through a standardized process. Thus, it would be desirable for a frying device to be able to extend the operating life of cooking oil without such unwanted drawbacks.

An additional drawback of current frying devices is that they generally have poor oil circulation, causing the cooking oil to remain in contact with the heating surface of the fryer for an extended period of time, causing the oil to locally overheat. As a result of the overheating, the degradation of the oil is accelerated, necessitating its early replacement.

Therefore, there is a need for an anti-oxidation frying device that utilizes a frying basket that has increased conductive surface area with which to contact with the cooking oil, such as vegetable oil, creating an electron rich reducing environment to prevent the oxidation of the cooking oil, and extend its service life. Still yet, there is a need for an anti-oxidation frying device that is configured to supply electrons to cooking oil to create an electron rich reducing environment to prevent the oxidation of food cooked therein. Furthermore, there is a need for an anti-oxidation frying device that counteracts the carcinogenic effects that occur in the food when it is prepared by a frying process.

SUMMARY OF THE INVENTION

One aspect of the present invention provides a frying device including a frying vessel having an electrically conductive body. The electrically conductive body is adapted to carry an amount of cooking oil. The frying device further includes a heating unit carried by the vessel. The device includes a basket adapted to be received within the frying vessel, the basket having an electrically conductive body having at least one aperture disposed therethrough to permit the passage of cooking oil therethough. Further, the frying device includes a rectification circuit adapted to be coupled to an alternating current (AC) power source to receive power therefrom. The rectification circuit is coupled to the heating element, the frying vessel, and the basket. The rectification circuit converts the alternating current (AC) power into a rippled, rectified AC current signal that is supplied across the heating element, the frying vessel, and the basket to form a reducing environment of available electrons for absorption by the food carried by the basket and the cooking oil.

In one or more embodiments, the rectification circuit is coupled to the electrically conductive body of the frying vessel by a first set of positive and negative terminals that are spaced apart from each other by about 180 degrees. More specifically, in some embodiments, the rectification circuit is coupled to the electrically conductive body of the basket by a second set of positive and negative terminals that are spaced apart from each other by about 180 degrees.

In the same or different embodiments, the electrically conductive body of the basket includes a plurality of spaced slats defining a plurality of passages therebetween to permit the passage of cooking oil therethrough. Some embodiments provide that a portion of the passages may be made solid to form a solid portion to prevent the passage of cooking oil therethrough. With those embodiments above, the frying vessel includes a baffle spaced above a bottom surface of the frying vessel to support the basket above the bottom surface of the frying vessel to form a gap therebetween, such that the passages and the solid portion are separated by the baffle.

In other embodiments, the electrically conductive body of the basket is formed of one or more continuous sheets of conductive material having one or more apertures disposed therethrough. A portion of the apertures may be made solid to form a solid portion to prevent the passage of cooking oil therethrough. In these embodiments, the frying vessel includes a baffle spaced above a bottom surface of the frying vessel to support the basket above the bottom surface to form a gap therebetween, such that the apertures and the solid portion are separated by the baffle.

Still another aspect of the present invention provides a method of extending the useful life of cooking oil. This method includes providing a frying vessel having an electrically conductive body carrying an amount of cooking oil therein to prepare food, the vessel including a heating unit to heat the cooking oil and including a rectification circuit having a first and a second connection point coupled to the body. In a further step, the method includes converting power from an alternating current (AC) power source into a rippled, rectified AC current signal at the rectification circuit. Finally, the method provides for supplying the rippled, rectified AC current across the first and the second connection points, so as to create a reducing environment of available electrons in the cooking oil for absorption by the cooking oil and the food. It will be appreciated that by creating a reducing environment of available electrons in the cooking oil, the useful life of the cooking oil is extended.

In the same or different embodiments, the rectification circuit may include a third and fourth connection point. A basket to carry food in may be provided, the basket having an electrically conductive body that is coupled to the basket. Further, the rippled, rectified AC current may be supplied across the third and the fourth connection points, so as to create a reducing environment of available electrons in the cooking oil for absorption by the cooking oil and the food.

In the same or different embodiments, the rectification circuit may include a fifth and sixth connection point that are coupled to the heating unit, the heating unit being disposed in the frying vessel. Further, the rippled, rectified AC current may be supplied across the fifth and the sixth connection points, so as to create a reducing environment of available electrons in the cooking oil for absorption by the cooking oil and the food.

Yet another aspect of the present invention provides a method for reducing the presence of acrylamide in cooked foods, including providing a frying vessel having an electrically conductive body carrying an amount of cooking oil therein to prepare food. The vessel includes a heating unit to heat the cooking oil and includes a rectification circuit having a first and a second connection point coupled to the body. A further step of the invention includes converting power from an alternating current (AC) power source into a rippled, rectified AC current signal at the rectification circuit. The rippled, rectified AC current may be supplied across the first and the second connection points, so as to create a reducing environment of available electrons in the cooking oil for absorption by the cooking oil and the food. It will be appreciated that by creating a reducing environment of available electrons in the cooking oil, acrylamide is reduced in cooked foods.

In the same or different embodiments, the rectification circuit may include a third and fourth connection point. A basket to carry food in may be provided, the basket having an electrically conductive body that is coupled to the basket. Further, the rippled, rectified AC current may be supplied across the third and the fourth connection points, so as to create a reducing environment of available electrons in the cooking oil for absorption by the cooking oil and the food.

In the same or different embodiments, the rectification circuit may include a fifth and sixth connection point that are coupled to the heating unit, the heating unit being disposed in the frying vessel. Further, the rippled, rectified AC current may be supplied across the fifth and the sixth connection points, so as to create a reducing environment of available electrons in the cooking oil for absorption by the cooking oil and the food.

BRIEF DESCRIPTION OF THE DRAWINGS

These and other features and advantages of the present invention will become better understood with regard to the following description, appended claims, and accompanying drawings wherein:

DETAILED DESCRIPTION OF THE INVENTION

Figure 1:
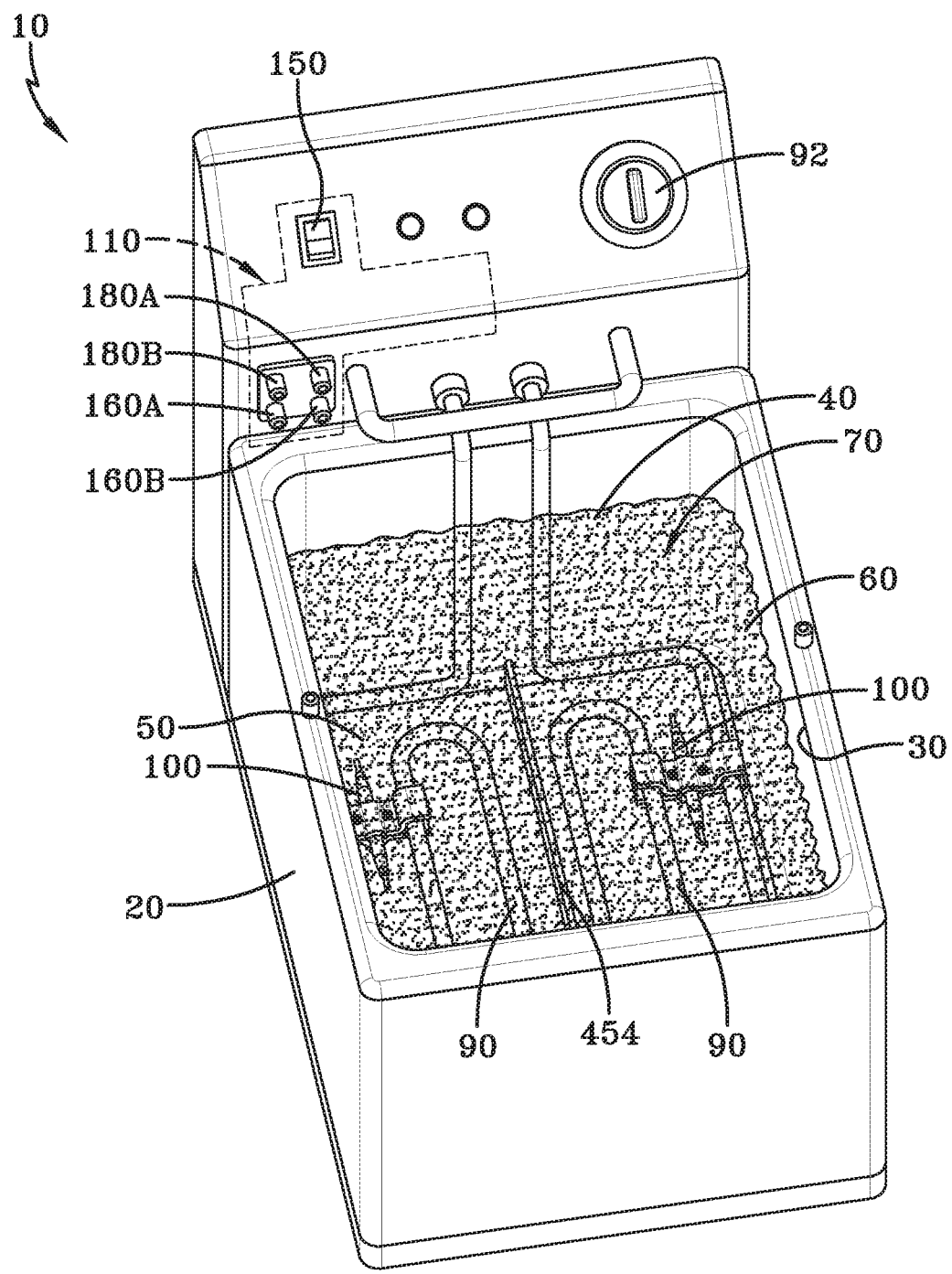
FIG. 1 is a perspective view of an anti-oxidation frying device having a frying vessel in accordance with the concepts of the present invention.

An anti-oxidation frying device in accordance with the concepts of the present invention is generally referred to by the numeral 10, as shown in FIG. 1 of the drawings. Continuing, the anti-oxidation frying device 10 comprises a frying vessel 20, such as a vat, having an electrically conductive body 30 For example, the body 30 of the vessel 20 may be formed of electrically conductive stainless steel. Carried within the frying vessel 20 is an amount of cooking oil 40, such as vegetable oil, however, any suitable non-electrolyte oil may be used. The frying vessel 20 includes a bottom surface 50 and a side wall 60 that bounds the bottom surface 50, so as to define a receiving cavity 70 therein. Positioned proximate to the bottom surface 50 of the vessel 50 is a heating unit 90, suitable for heating the cooking oil 40 carried within the receiving cavity 70. In one aspect, the heating unit 90 may comprise an inductive-type heating device, or a resistive-type heating device, such as that shown in the Figs. Also disposed and carried by the frying vessel 20 at a point proximate to the bottom surface 50 of the frying vessel 20 is one or more temperature sensors 100 to control the temperature of the oil during operation of the frying device 10, as set by a temperature setting switch 92.

Figure 2:
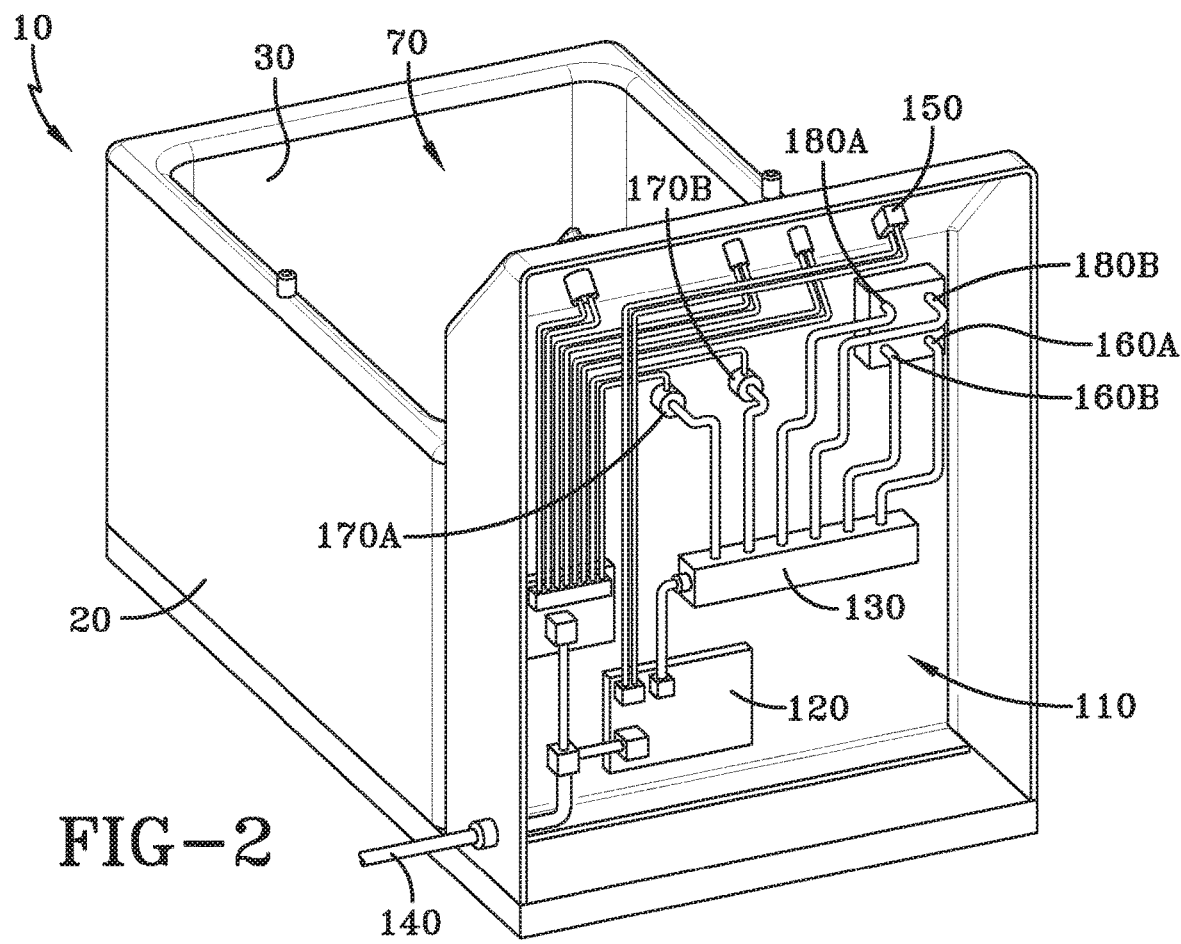
FIG. 2 is a perspective view of the rear portion of the anti-oxidation frying device in accordance with the concepts of the present invention.
Figure 2A:
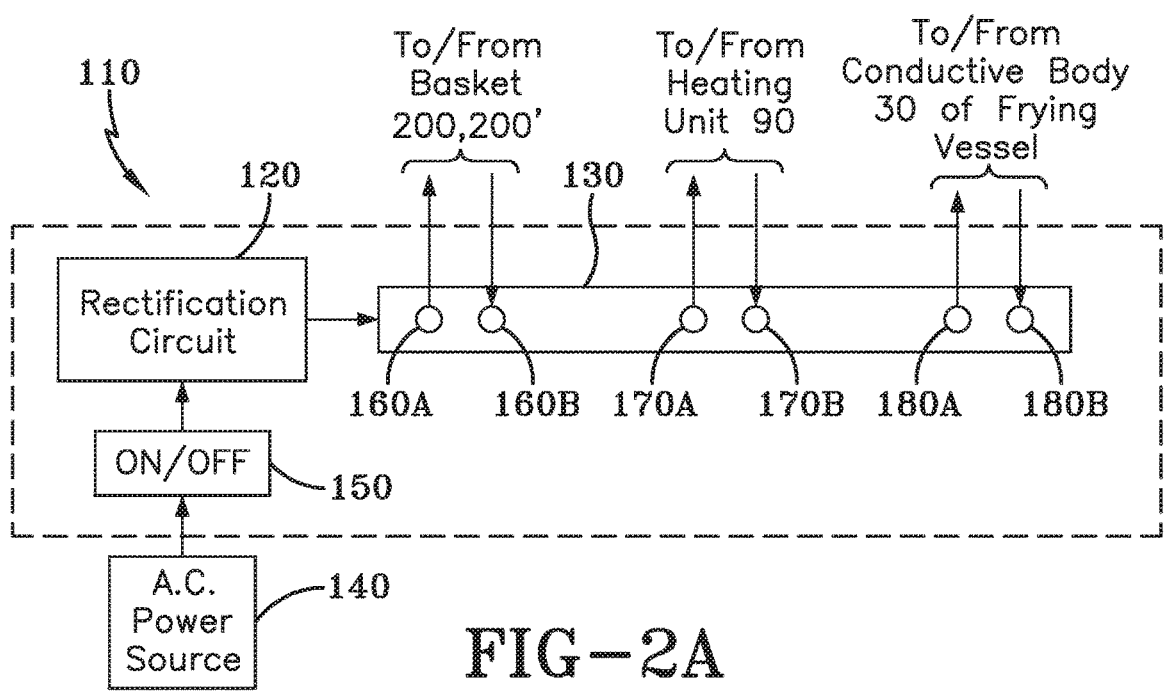
FIG. 2A is a perspective view of a converter module used by the anti-oxidation frying device in accordance with the concepts of the present invention.

The frying device 10 also includes a converter module 110 that comprises a rectification circuit 120 that is coupled to a power distribution block 130, shown clearly in FIG. 2. The rectification circuit 120 is powered by an alternating current (AC) power source 140, which is selectively controlled by an on/off switch 150. It should be appreciated that the power source 140 comprises an external source, such as that supplied by a standard electrical outlet or receptacle. Thus, when the switch 150 is placed into its on state, the rectification circuit generates a rippled rectified alternating current (AC) that is supplied across a plurality of power ports 160A-B, 170A-B, and 180A-B coupled thereto, such that the power ports 160, 170, 180 designated with reference character "A" is a positive (+) port, and those designated with reference character "B" is a negative (−) port. It should also be appreciated that the on/off switch 150 also controls the ON/OFF state of the heating unit 90 using known techniques. It should also be appreciated that the components of the converter module 110 may be retrofit to an existing frying device, provided as a separate device, or provided integrally with the frying device. It is also contemplated that the rectification circuit 120 may be coupled to the external power source 140 using an inductive method, such as that set forth in U.S. Pat. No. 8,076,620, incorporated herein by reference.

Figure 3:
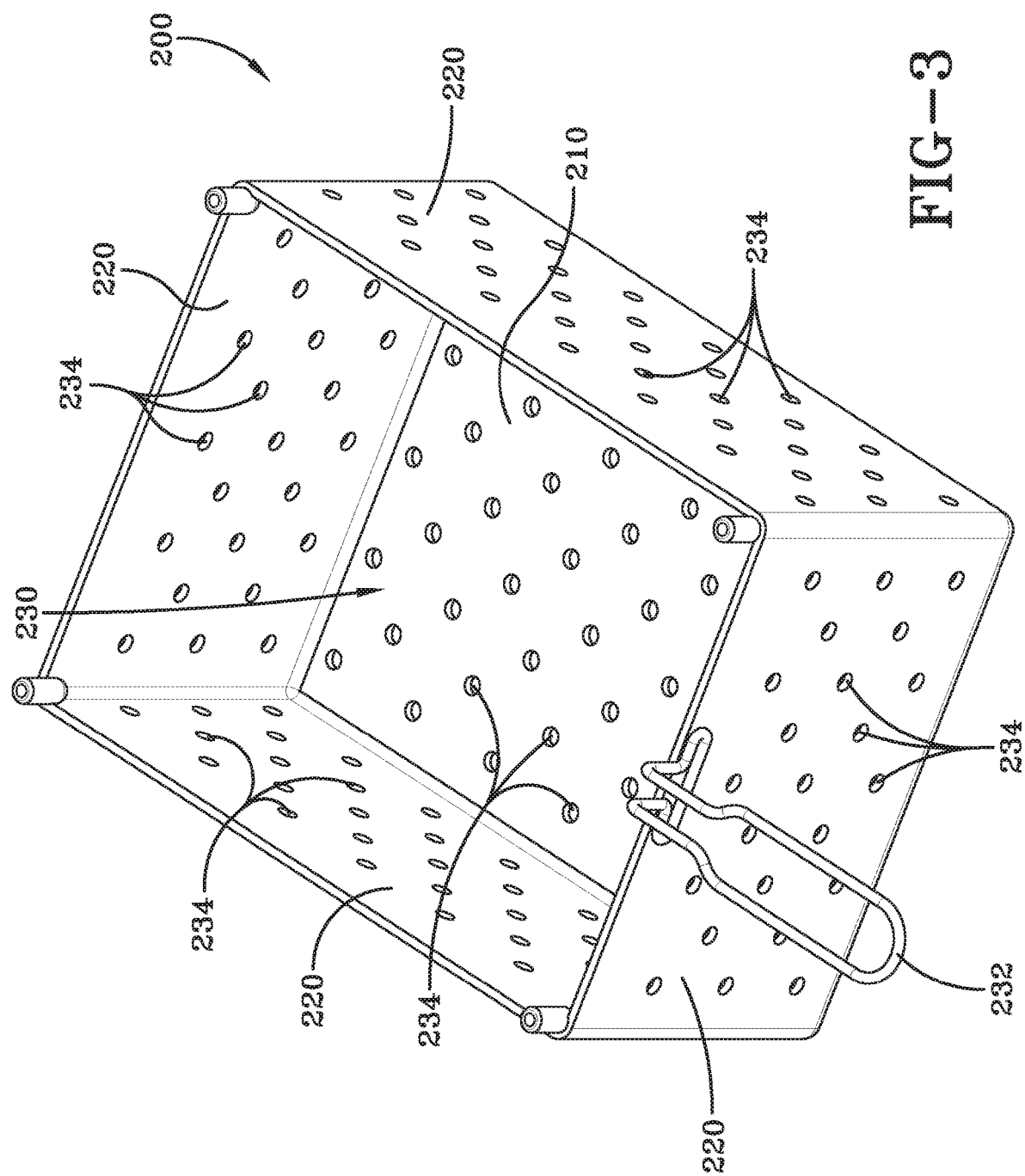
FIG. 3 is a perspective view of a basket having a plurality of drain apertures disposed therethrough in accordance with the concepts of the present invention.

The receiving cavity 70 of the frying vessel 20 is dimensioned to receive a cooking basket 200 therein. The cooking basket 200 comprises an electrically conductive material, such a stainless steel, although any other suitable conductive material can be used. In one aspect, the basket 200 may be formed of partially electrically conductive and partially electrically non-conductive material. In one embodiment, the basket 200, as shown in FIG. 3, includes a base 210 formed as a single sheet of electrically conductive material that this bounded by a plurality of wall sections 220 that extend therefrom at a substantially right angle, which also comprises one or more sections of electrically conductive material. Together the base and wall section 210,220 form a cavity 230 that allows food to be carried or retained therein as the basket 200 is submerged in the hot oil 40 during the cooking process. It should be appreciated that the basket 200 may be formed as a single, continuous sheet of material that is contoured so as to form the cavity 230, as well. A handle 232 extends from one of the wall sections 220 to facilitate the insertion and removal of the basket 200 into and out of the receiving cavity 70 of the frying device 10. In addition, the base and wall section 210, 220 are configured with a plurality of perforations or drain apertures 234 disposed therethrough. It should be appreciated that the perforations or apertures 234 disposed through the basket 200 inhibit the formation of moisture that can accumulate on the base 210 of the basket 200. Moreover, the drain apertures 234 are configured to facilitate the circulation of the hot cooking oil through the basket 200 to facilitate the cooking process of the food. The drain apertures 230 also serve to allow the cooking oil to drain out of the basket 200 and away from the food when the basket 200 has been removed from the hot cooking oil when the food has been cooked.

Figure 4:
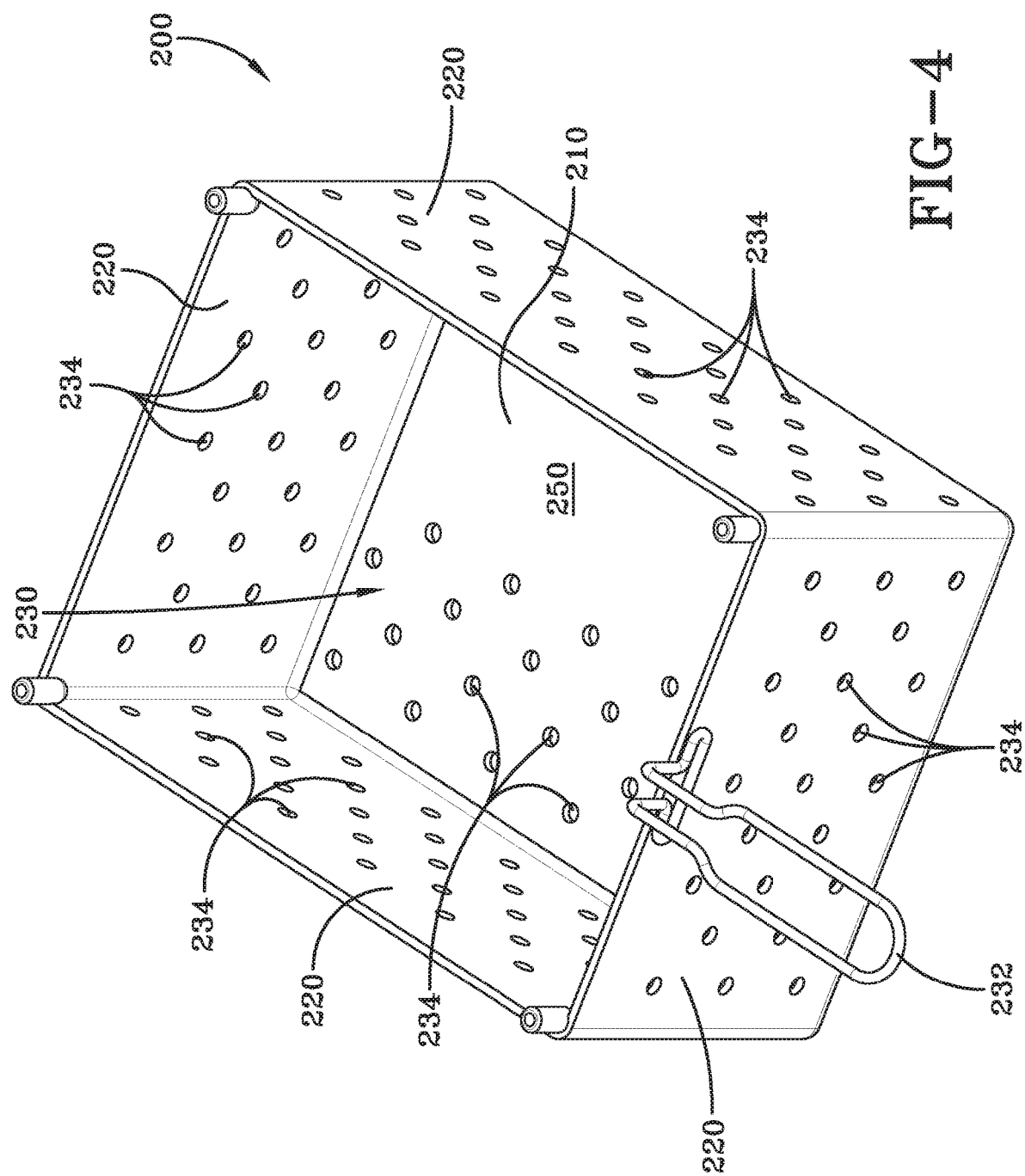
FIG. 4 is a perspective view of the basket of FIG. 3 having a partially solid and partially perforated base in accordance with the concepts of the present invention.

It is also contemplated that the base 210 of the basket 200 may be configured such that only a portion of the base 210 includes drain apertures 230, while the remaining portion is made solid forming a barrier section 250, as shown in FIG. 4, to prevent the passage of the cooking oil 40 therethrough.

Figure 5:
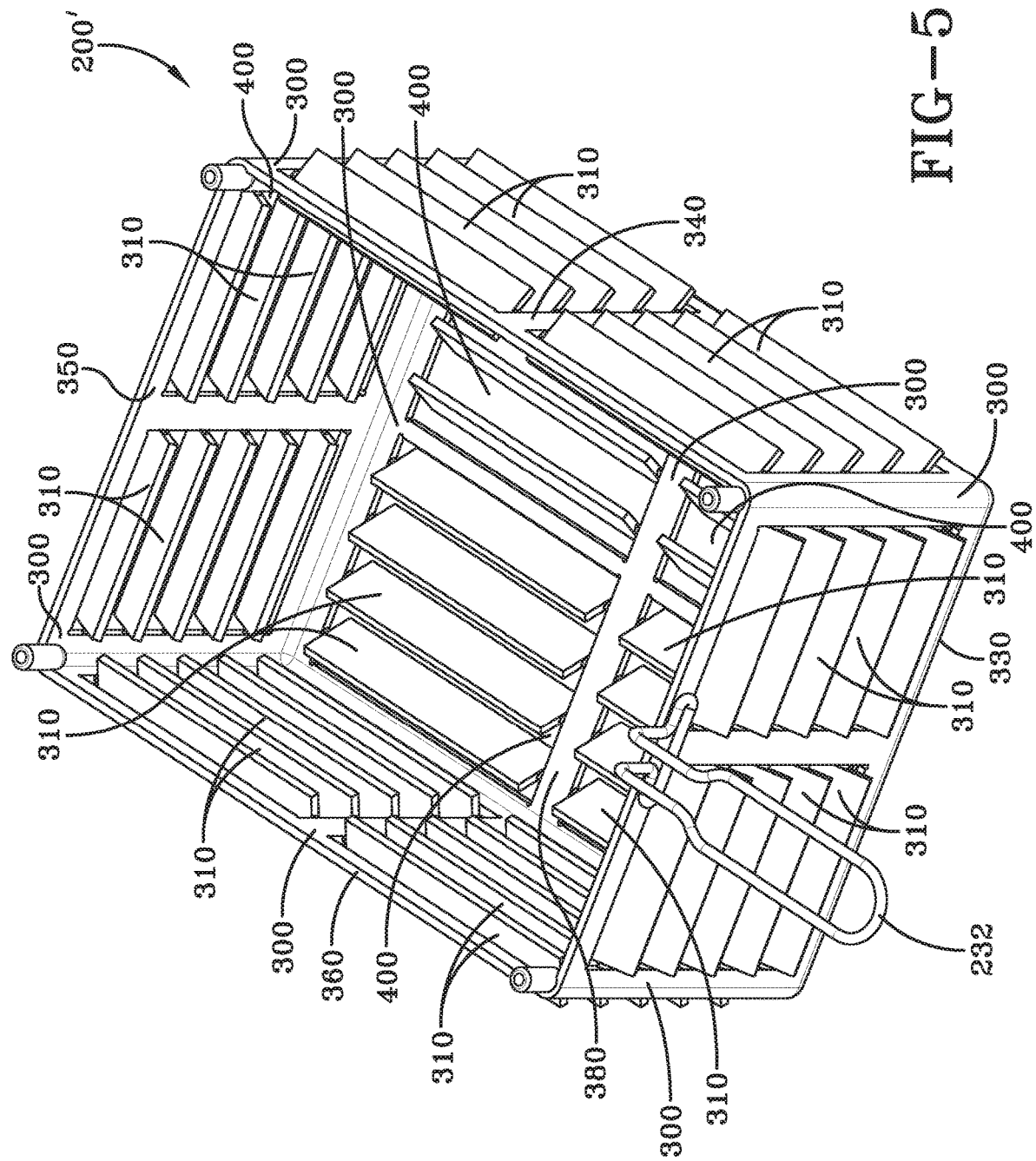
FIG. 5 is a perspective view of an alternative basket having a plurality of slats in accordance with the concepts of the present invention.

In another embodiment, a basket 200' may be configured with an electrically conductive frame 300 that supports a plurality of spaced slat sections 310, as shown in FIG. 5. Specifically, the slat sections 310 are attached to the frame 300, and are spaced substantially vertically to form side sections 330,340,350 and 360 of the basket 200'. The basket 200' also includes a base 380 that is also formed by horizontally spaced slat sections 310 that are attached to the frame 300. As such, the spacing between the slat sections 310 of each of the side 330,340,350,360 and bottom section 380 form passages 400 therebetween.

Figure 6:
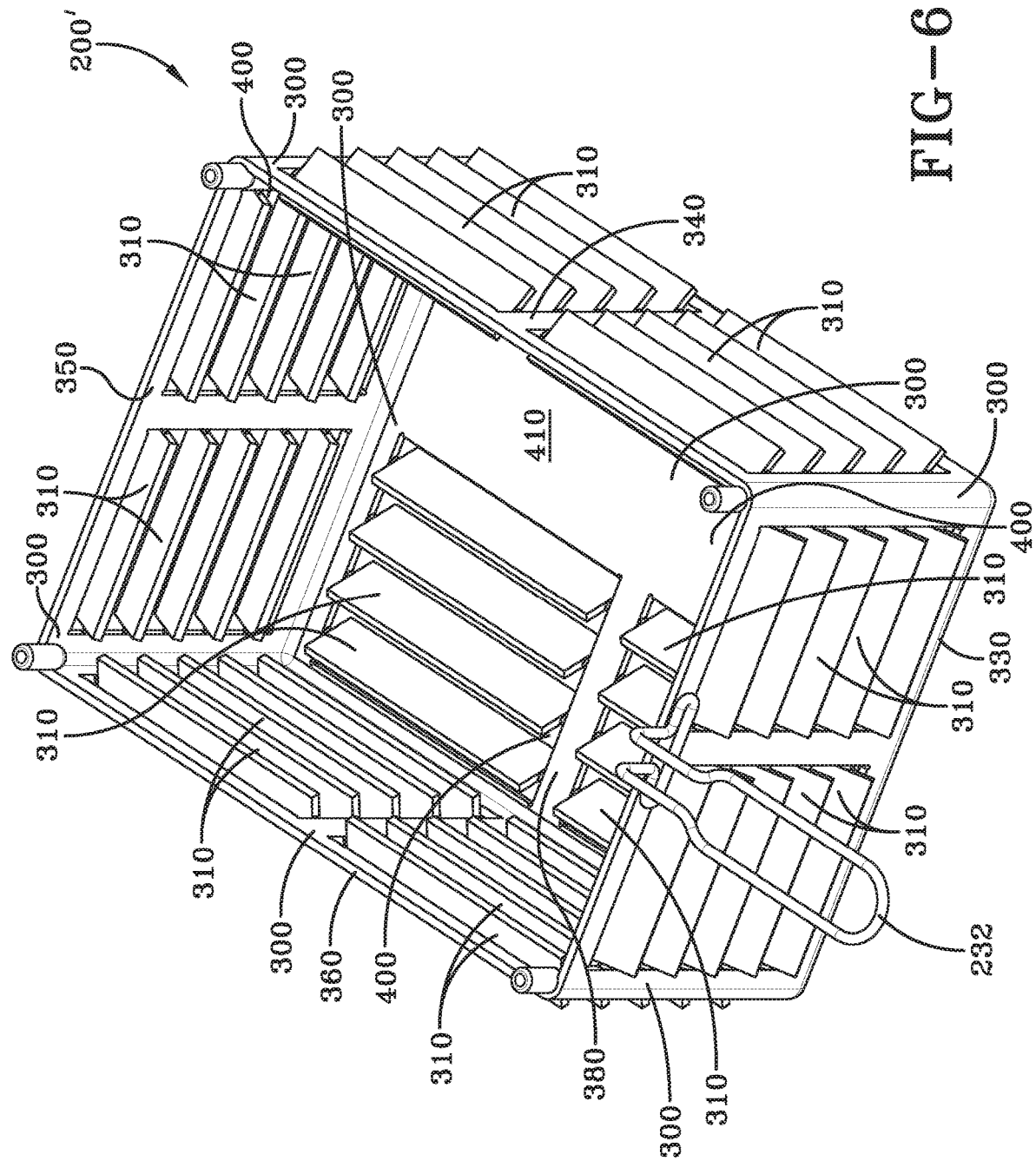
FIG. 6 is a perspective view of the alternative basket of FIG. 5 having a partially solid and partially slotted base in accordance with the concepts of the present invention.

It is also contemplated that the base 380 may be configured such that only a portion includes passages 400, while the remaining portion remains solid forming a barrier section 410 that prevents the passage of the cooking oil 40 therethrough, as shown in FIG. 6.

Figure 7:
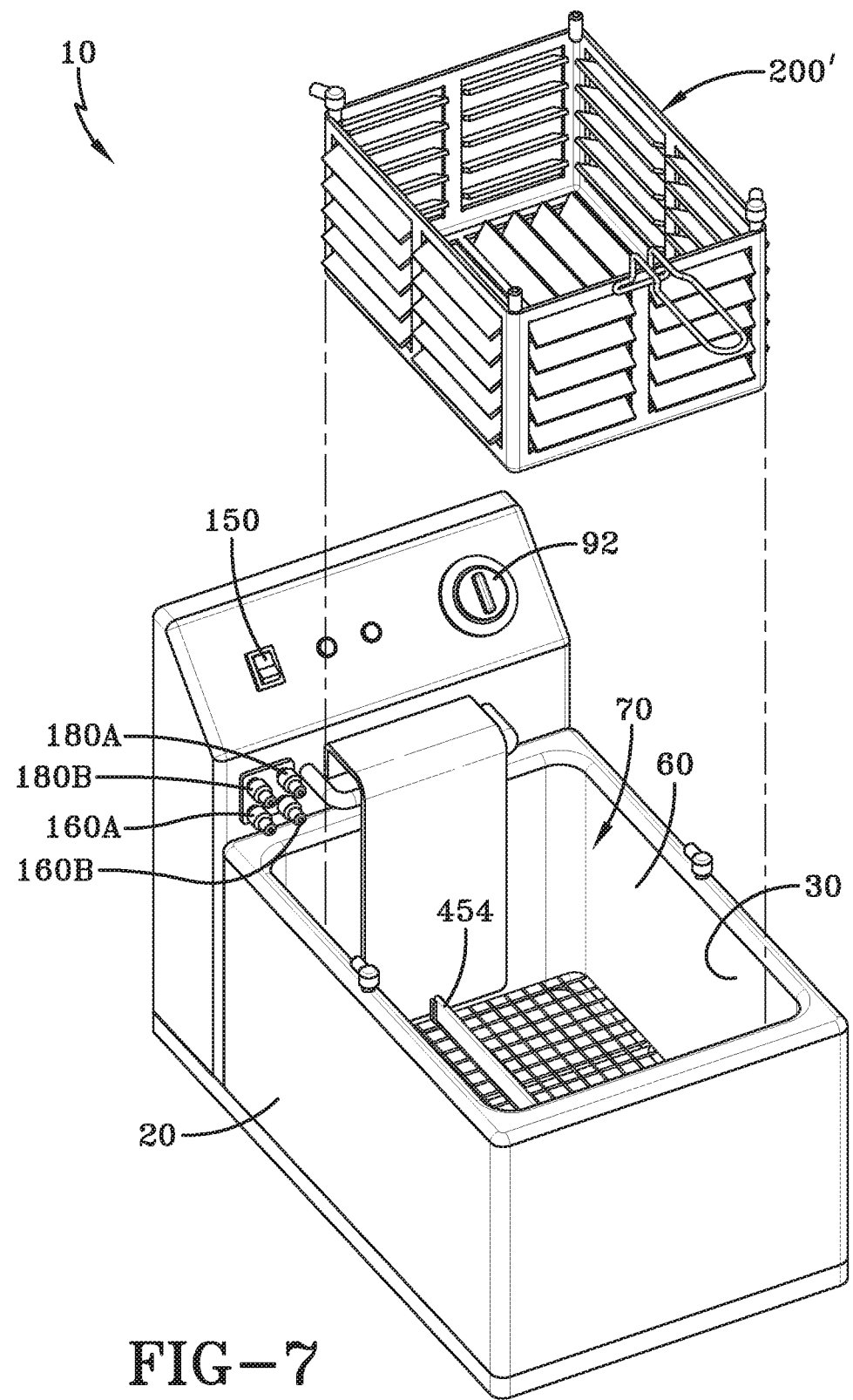
FIG. 7 is a perspective of the alternative basket and anti-oxidation frying device in accordance with the concepts of the present invention.
Figure 8:
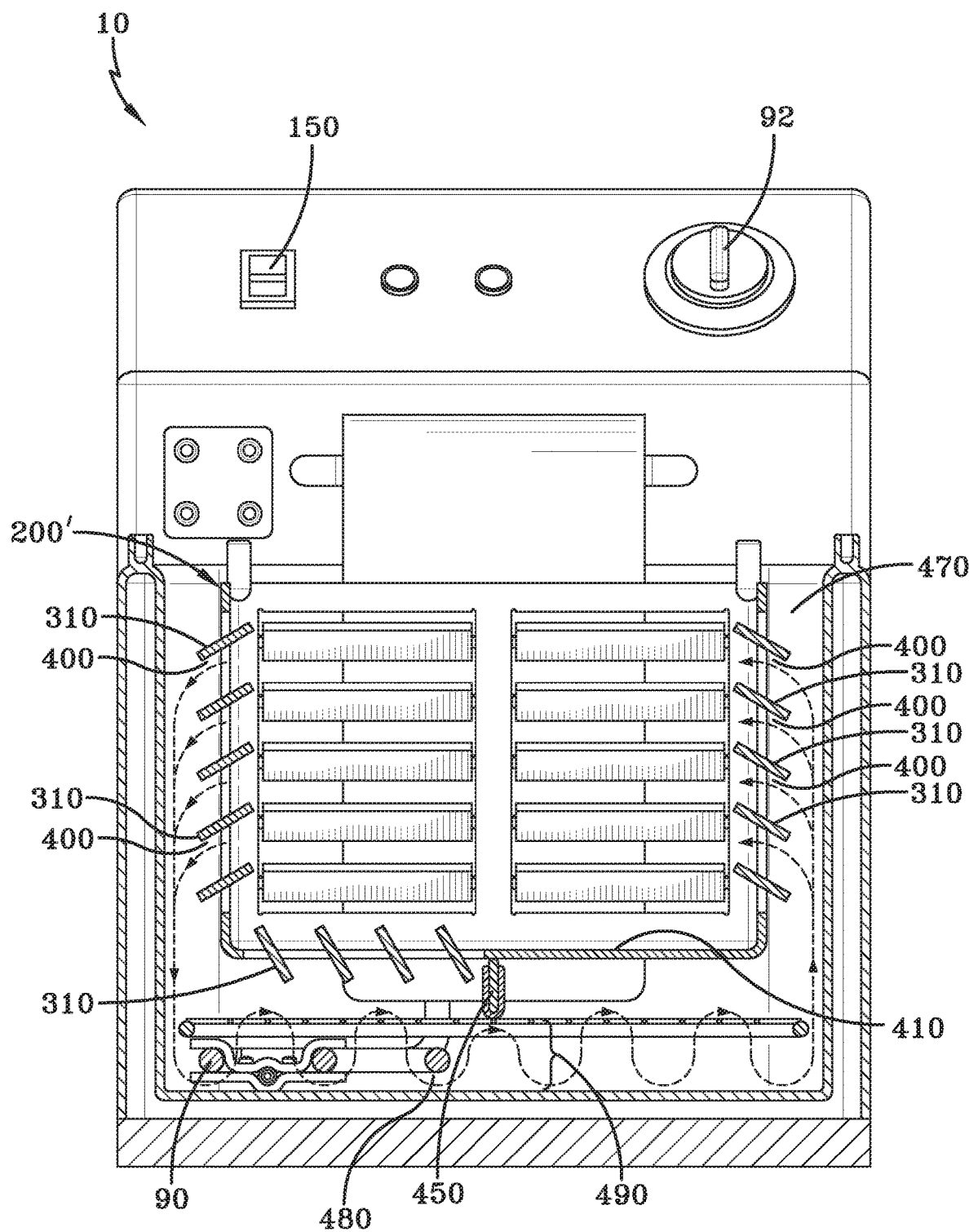
FIG. 8 is a cross-sectional view of the anti-oxidation frying device showing the flow of cooking oil through the basket in accordance with the concepts of the present invention.
Figure 9:
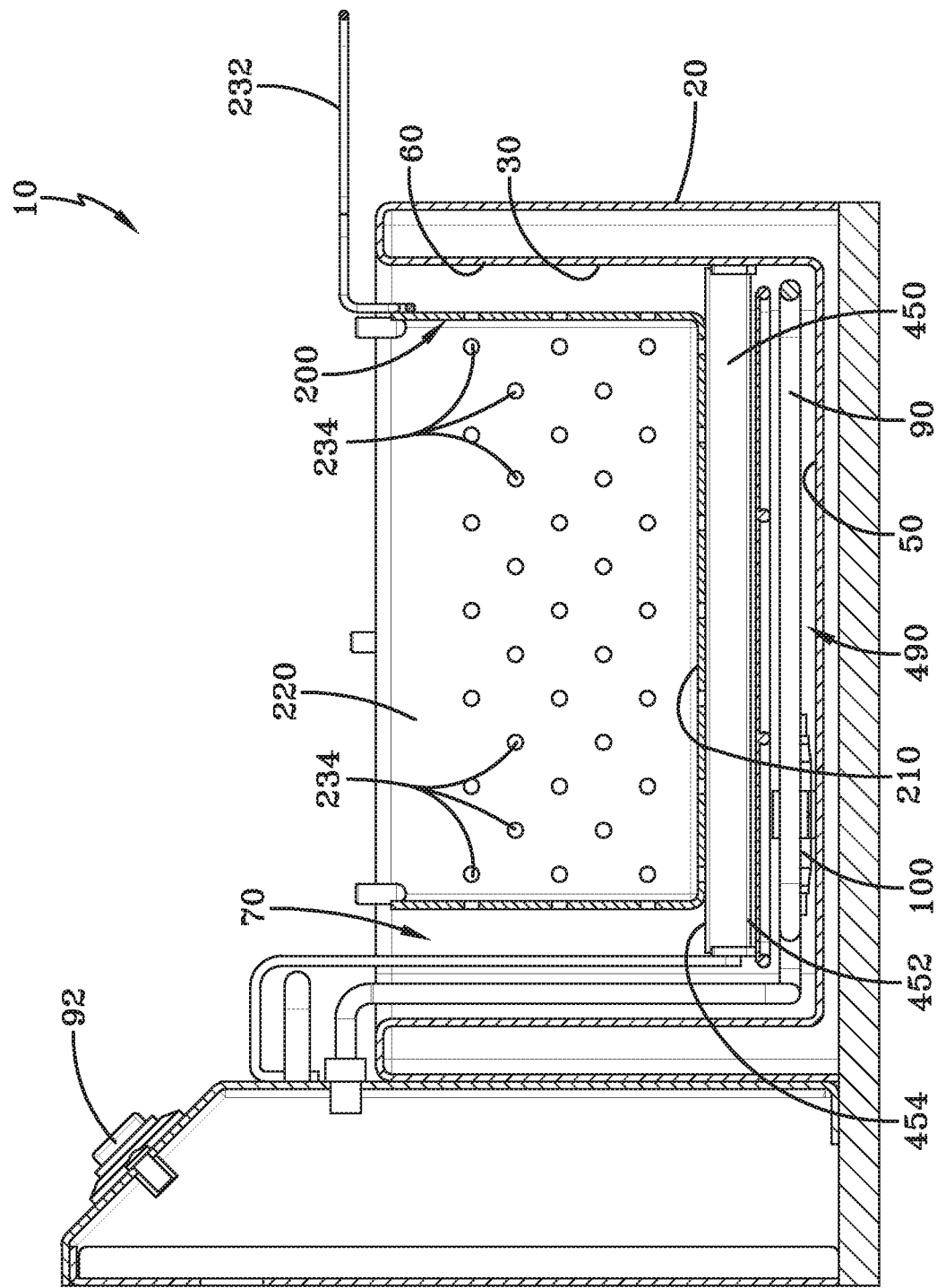
FIG. 9 is a side cross-sectional view of the anti-oxidation frying device showing the basket carried therein in accordance with the concepts of the present invention.
Figure 10:
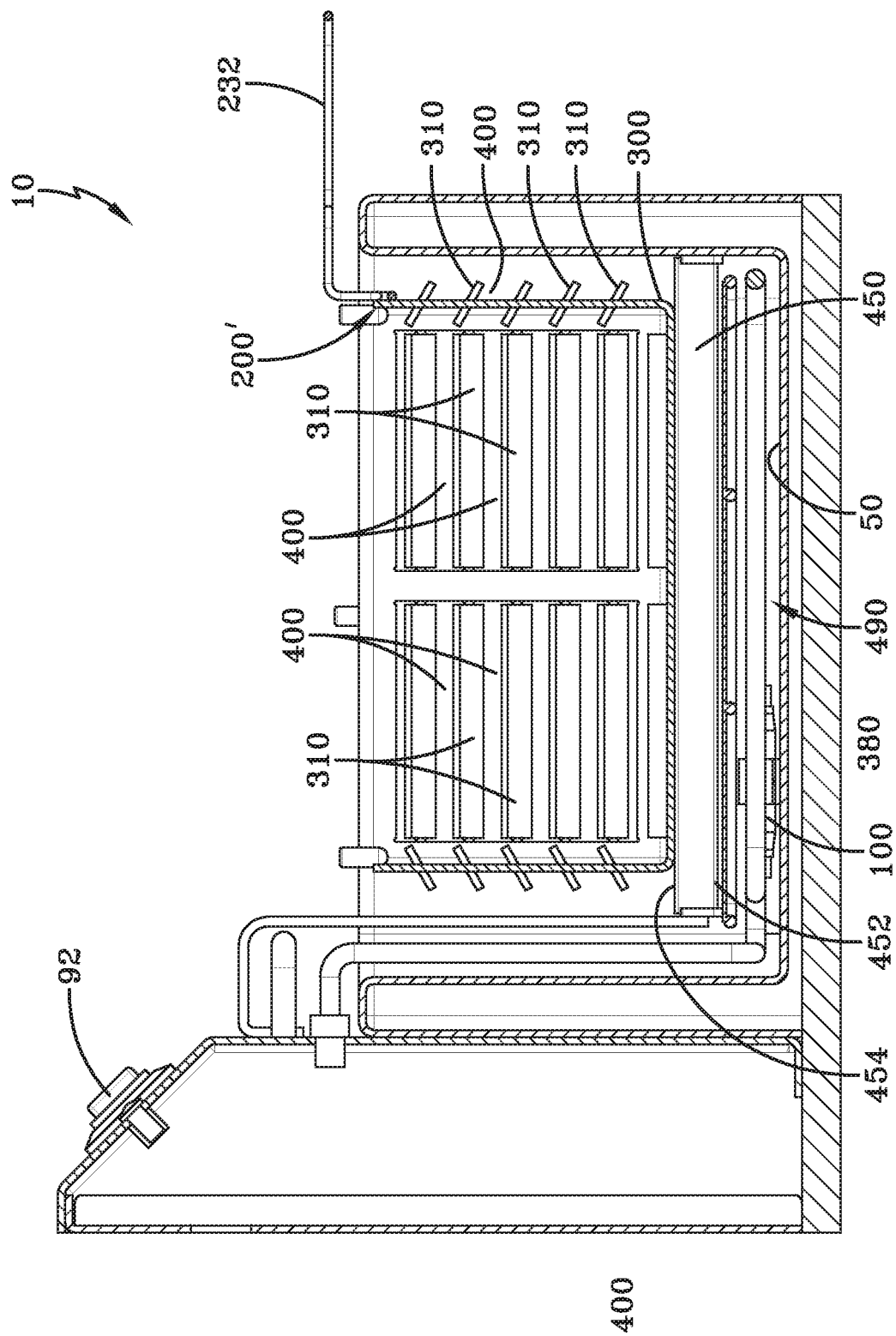
FIG. 10 is a side cross-sectional view of the anti-oxidation frying device showing the alternative basket carried therein in accordance with the concepts of the present invention.

In addition, as shown in FIG. 7, the frying vessel 20 may include one or more baffles 450 that extends from the side wall 60 or bottom 90 of the frying vessel 20. The baffle 450 may comprise a substantially vertical section that extends from a base edge 452 to a support edge 454. As such, the baffle 450 is positioned so that it effectively separates the frying vessel 20 into an upper and lower region 470,480, and forms a gap 490 between the bottom 50 of the frying vessel 20 and the base edge 452 of the baffle 450. Thus, when the baskets 200 and 200' using respective barrier sections 250 and 410 are inserted into the upper region 470 of the receiving cavity 70 of the frying vessel 20 created by the baffle 450, such that the bottoms 210,380 of the respective baskets 200,200' rests upon the support edge 454 of the baffle 450, as shown in respective FIGS. 9 and 10. Furthermore, the bottom surfaces 210, 380 of the baskets 200,200' are configured, such that when they are resting upon the support edge 454 of the baffle 450 the perforations 234 in the case of basket 200, and the passages 400 in the case of basket 200' of the bottoms 210,380 are effectively separated from respective barrier sections 250 and 410 by the length dimension of the baffle 450. Furthermore, the heating unit 90 is configured so that it is only beneath the barrier sections 250 and 410. Thus, for the purposes of the following discussion, only basket 200' is discussed with regard to the cycling flow of the cooking oil 40, but is equally applicable to basket 200, as well. Specifically, as shown in FIGS. 9 and 10, and clearly in FIG. 8, the basket 200' allows cooled cooking oil 40 to flow out of the passages 400 on the left-hand side of the basket 200', whereupon it is heated by the heating unit 90. Next, the heated cooking oil 40 passes through the gap 490 defined by the baffle 450, whereupon due to its heated state, rises upward, entering the passages 400 on the right-hand side of the basket 200'. This continual cycling of the cooking oil 40 through the basket 200' and past the heating unit 90 prevents the cooking oil from remaining in contact with the heating element for an extended period of time and overheating. Heat transfer is also improved, and cooking time is also reduced.

Figure 11:
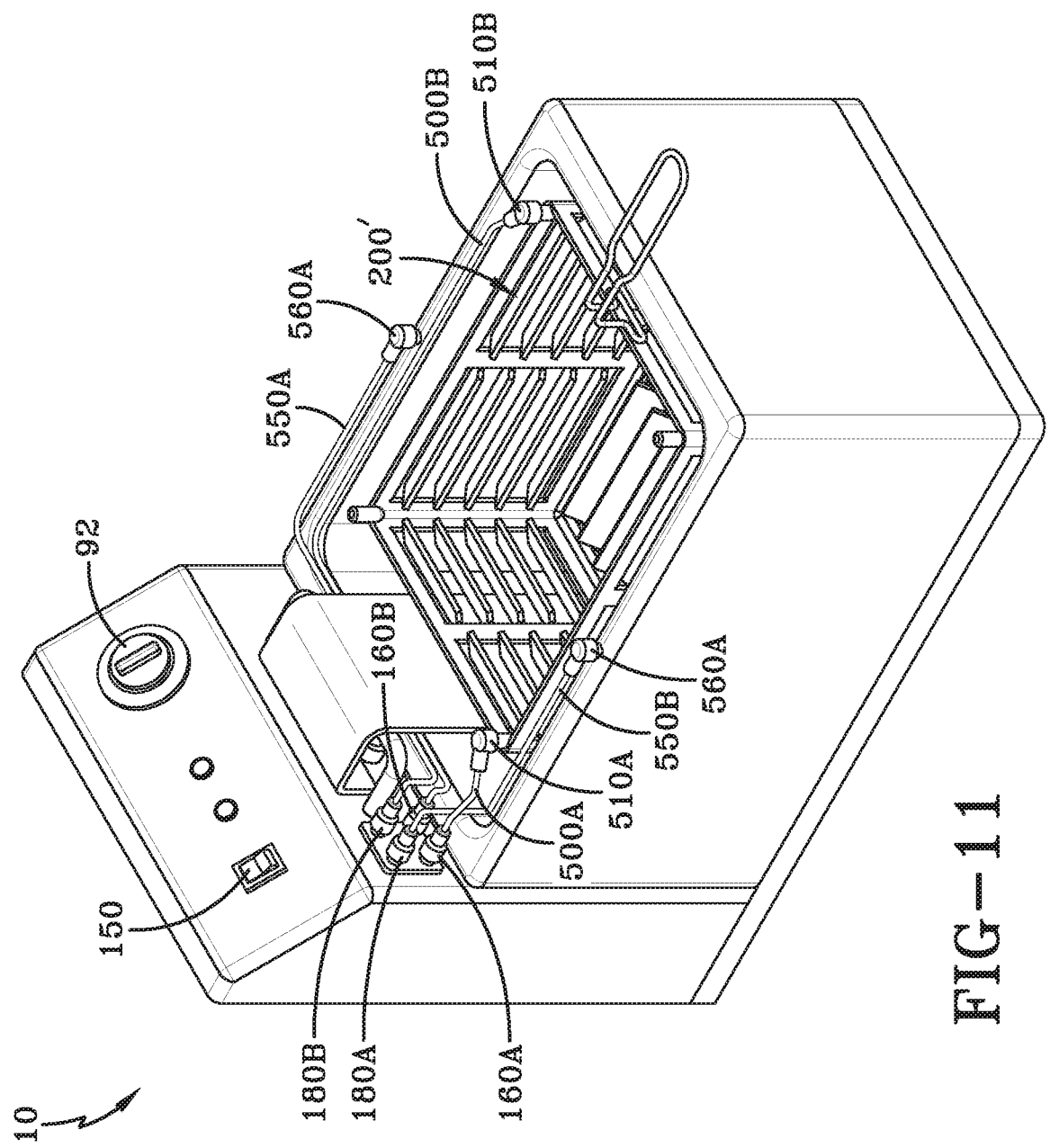
FIG. 11 is perspective view showing the alternative basket carried in the anti-oxidation frying device in accordance with the concepts of the present invention.

In order to create an electron rich reducing environment within the cooking oil to extend its life, the baskets 200,200', the heating unit 90, and the body 30 of the frying vessel 20 are coupled to the rectification circuit 120 via the respective power ports 160A-B, 170A-B, and 180A-B previously discussed, as shown in FIG. 11. Specifically, power ports 160A-B are coupled by respective wires 500A and 500B across the basket 200' at respective basket terminals 510A and 510B; power ports 170A-B are coupled by respective wires 530A and 530B across the heating unit 90 at respective heating terminals 540A and 540B; and power ports 180A-B are coupled by respective wires 550A and 550B across the frying vessel 30 at respective vessel terminals 560A and 560B. It should be appreciated that the position of the basket and vessel terminals 510A-B are positioned so that they are approximately 180 degrees from one another, or otherwise substantially opposite to one another.

Thus, when the on/off switch 150 is turned to its on state, the rippled, rectified AC current signal generated by the rectification circuit 120 is supplied across the baskets 200, 200', the body 30 of the frying vessel 20, and the heating unit 90, thus creating a flow of electrons through the cooking oil 40 between each of the respective terminals 510A-B, 540A-B, and 560A-B of the baskets 200,200', body 30 of frying vessel 20, and heating unit 90, thus forming an electron rich reducing environment that prevents the oxidization of the cooking oil 40 and food cooked therein. As a result, the useful operating life of the cooking oil 40 is extended, while prevent the oxidation and formation of carcinogenic acrylamide in the food. In determining whether the life of the cooking oil has been extended or not, little research has been done; however, it is submitted that in a journal article entitled "Effect of a Novel Induction Food-Processing Device in Improving Frying Oil Quality" to be published 2013, in the Journal of Food Processing and Preservation (Elsevier Press), incorporated herein by reference, sets forth the experimental tests that validate the life extending effects that the present invention has on the cooking oil by, for example, eliminating from or reducing the undesirable compounds in the oil.

It will, therefore, be appreciated that one advantage of one or more embodiments of the present invention is that and anti-oxidation frying device provides a rectification circuit an AC power from an external power source into rippled, rectified AC current for delivery to the frying vessel so as to provide a reducing environment of available electrons for absorption by the cooking oil and food being prepared therein. Still another advantage of the present invention is that a basket used to retain food as it is cooked within the frying vessel is formed of one or more continuous sheets of material with one or more apertures disposed therethrough to increase the conductive surface area of the basket to enhance the electron rich reducing environment formed by the present invention, and to minimize the moisture that develops thereon during use. Yet another advantage of the present invention is that a basket used to retain food as it is cooked within the frying vessel is formed from a plurality of spaced slats that have passages therebetween to increase the conductive surface area of the basket to enhance the electron rich reducing environment formed by the present invention. Another advantage of the present invention is that the frying vessel includes a baffle to carry the basket thereon and to create a space for the cooking oil to pass as it heats and cools and cycles through the basket, so as to minimize the contact time of the heating oil with the heating unit, so as to extend of the life of the heating oil. A further advantage of the present invention is that the rectification circuit may be maintained or otherwise carried by the vessel.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms that may come within the language and scope of the attached claims.

What is claimed is:

1. A method of extending a useful life of cooking oil comprising:
   providing a frying vessel having an electrically conductive body carrying an amount of cooking oil therein to prepare food, said vessel including a heating unit to heat the cooking oil, said vessel including a rectification circuit having a first connection point and a second connection point each coupled to said body;
   providing a basket to carry food therein, said basket placeable within said frying vessel;
   converting power from an alternating current (AC) power source into a rippled, rectified AC current signal at said rectification circuit;
   supplying said rippled, rectified AC current to said frying vessel across said first connection point and said second connection point, so as to create a reducing environment of available electrons in the cooking oil for absorption by the cooking oil and the food, whereby the reducing environment extends the useful life of the cooking oil; and
   supplying said rippled, rectified AC current directly to said basket and directly to said heating unit.

2. The method of claim 1, wherein said rectification circuit includes a third connection point and a fourth connection point; and wherein said basket is made from an electrically conductive material, and wherein said third connection point and said fourth connection point are each coupled to said basket; and wherein said rippled, rectified AC current is supplied to said basket across said third connection point and said fourth connection point, so as to create a reducing environment of available electrons in the cooking oil for absorption by the cooking oil and the food.

3. The method of claim 2, wherein said rectification circuit includes a fifth connection point and a sixth connection point that are each coupled to said heating unit, said heating unit disposed in said frying vessel; and wherein said rippled, rectified AC current is supplied to said heating unit across said fifth connection point and said sixth connection point, so as to create a reducing environment of available electrons in the cooking oil for absorption by the cooking oil and the food.

4. A method for reducing a presence of acrylamide in cooked foods, comprising:

providing a frying vessel having an electrically conductive body carrying an amount of cooking oil therein to prepare food, said vessel including a heating unit to heat the cooking oil, said vessel including a rectification circuit having a first connection point and a second connection point each coupled to said body;

providing a basket to carry food therein, said basket placeable within said frying vessel;

converting power from an alternating current (AC) power source into a rippled, rectified AC current signal at said rectification circuit;

supplying said rippled, rectified AC current to said frying vessel across said first connection point and said second connection point, so as to create a reducing environment of available electrons in the cooking oil for absorption by the cooking oil and the food, whereby the reducing environment reduces acrylamide in cooked foods; and supplying said rippled, rectified AC current directly to said basket and directly to said heating unit.

5. The method of claim 4, wherein said rectification circuit includes a third connection point and a fourth connection point; and wherein said basket is made from an electrically conductive material, and wherein said third connection point and said fourth connection point are each coupled to said basket; and supplying said rippled, rectified AC current is supplied to said basket across said third connection point and said fourth connection point, so as to create a reducing environment of available electrons in the cooking oil for absorption by the cooking oil and the food.

6. The method of claim 5, wherein said rectification circuit includes a fifth connection point and a sixth connection point that are each coupled to said heating unit, said heating unit disposed in said frying vessel; and wherein said rippled, rectified AC current is supplied to said heating unit across said fifth connection point and said sixth connection point, so as to create a reducing environment of available electrons in the cooking oil for absorption by the cooking oil and the food.

* * * * *